United States Patent
Nicholson et al.

(10) Patent No.: US 9,437,195 B2
(45) Date of Patent: Sep. 6, 2016

(54) BIOMETRIC PASSWORD SECURITY

(71) Applicant: Lenovo (Singapore) Pte. Ltd., Singapore (SG)

(72) Inventors: John Weldon Nicholson, Cary, NC (US); Steven Richard Perrin, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 142 days.

(21) Appl. No.: 14/030,919

(22) Filed: Sep. 18, 2013

(65) Prior Publication Data

US 2015/0081301 A1    Mar. 19, 2015

(51) Int. Cl.
   *G10L 15/00*   (2013.01)
   *G10L 17/24*   (2013.01)

(52) U.S. Cl.
   CPC ..................... *G10L 17/24* (2013.01)

(58) Field of Classification Search
   USPC .................................................. 704/246–252
   See application file for complete search history.

(56) References Cited

U.S. PATENT DOCUMENTS

| | | | |
|---|---|---|---|
| 6,519,561 B1 * | 2/2003 | Farrell et al. ................. | 704/232 |
| 7,386,448 B1 * | 6/2008 | Poss ........................ | G10L 17/24 379/188 |
| 7,949,535 B2 * | 5/2011 | Ohta ........................ | G06F 21/32 379/93.03 |
| 8,645,137 B2 * | 2/2014 | Bellegarda et al. ........ | 704/250 |
| 2004/0230420 A1 * | 11/2004 | Kadambe ................ | G10L 15/07 704/205 |
| 2007/0266154 A1 * | 11/2007 | Ohta .................... | G06F 21/316 709/225 |
| 2009/0052635 A1 * | 2/2009 | Jones .................. | H04M 3/4936 379/88.02 |
| 2009/0206993 A1 * | 8/2009 | Di Mambro et al. ....... | 340/5.84 |
| 2012/0239398 A1 * | 9/2012 | Farrell et al. ................. | 704/239 |
| 2013/0018657 A1 * | 1/2013 | Di Mambro et al. ........ | 704/249 |
| 2013/0030809 A1 * | 1/2013 | Farrell et al. ................. | 704/249 |
| 2013/0166295 A1 * | 6/2013 | Shriberg et al. .............. | 704/243 |
| 2013/0166296 A1 * | 6/2013 | Scheffer ........................ | 704/243 |
| 2014/0195236 A1 * | 7/2014 | Hosom et al. ................ | 704/249 |

* cited by examiner

*Primary Examiner* — Leonard Saint Cyr
(74) *Attorney, Agent, or Firm* — Schwegman Lundberg & Woessner, P.A.

(57) ABSTRACT

A system includes a user speech profile stored on a computer readable storage device, the speech profile containing a plurality of phonemes with user identifying characteristics for the phonemes, and a speech processor coupled to access the speech profile to generate a phrase containing user distinguishing phonemes based on a difference between the user identifying characteristics for such phonemes and average user identifying characteristics, such that the phrase has discriminability from other users. The speech processor may also or alternatively select the phrase as a function of ambient noise.

19 Claims, 3 Drawing Sheets

| PHONEME | DELTA |
|---------|-------|
| "b" | 50 |
| "d" | 80 |
| "t" | 30 |
| ⋮ | ⋮ |
| "th" | 10 |
| "sh" | 70 |
| "ch" | 60 |
| "r" | 90 |
| ⋮ | ⋮ |

| PHRASE | PHONEMES |
|---|---|
| THE CHURCH | "th", "ch", "ch", "r" |
| BIG SHIRT TOY | "b", "sh", "t", "r" |
| SHORT DOGS RUN | "sh", "d", "r", "r" |
| ⋮ | ⋮ |

BIOMETRIC PASSWORD SECURITY

BACKGROUND

Voice biometric passwords are used as a form of speaker verification and are available on some systems and may grow in ubiquity in the near term. Such passwords are based upon identifying features in speech, which when taken in combination uniquely identify an individual with a certain probability.

Noise reduction algorithms may be used to reduce the effects of background noise on both collection of samples to form models representing features in speech and in use of the models to identify speakers. Such noise reduction algorithms may also affect system performance.

SUMMARY

A system includes a user speech profile stored on a computer readable storage device, the speech profile containing a plurality of phonemes with user identifying characteristics for the phonemes, and a speech processor coupled to access the speech profile to generate a phrase containing user distinguishing phonemes based on a difference between the user identifying characteristics for such phonemes and average user identifying characteristics, such that the phrase has discriminability from other users.

In a further embodiment, a system includes an audio input to receive speech from a user, the speech including ambient noise proximate the user and a speech processor coupled to the audio input to generate a phrase containing user distinguishing phonemes as a function of the ambient noise such that the phrase has discriminability from the ambient noise, from other users, or from both ambient noise and other users.

A method includes receiving an ambient noise signal proximate a user and generating a phrase containing user distinguishing phonemes as a function of the ambient noise such that the phrase has discriminability from the ambient noise, from other users, or from both ambient noise and other users.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Many different technologies are used in different speaker verification systems, such as frequency estimation, hidden Markov models, Gaussian mixture models, pattern matching, neural networks, and others. These technologies may rely on variations in phonemes, which are speech sounds. Consonant sounds are single letter sounds, such as "b", "d", "t", etc. Consonant digraphs are two letter sounds, such as "th", "sh", "ch" and others. Short vowel sounds correspond to the various vowels in the alphabet. Other types of vowel sounds include long vowel sounds, other vowel sounds, vowel diphthongs, and vowel sounds influenced by "r".

In various embodiments, phrases are generated for a person to speak that maximize the discriminability for the given person such as a user of a system to provide the user access to the system. The phrase which a user may be asked to speak contains phonemes that are known to be more distinguishing from other users. In further embodiments, phrases are selected that contain phonemes that are least likely to be adversely affected in the presences of ambient noise.

Figures 1, 2:
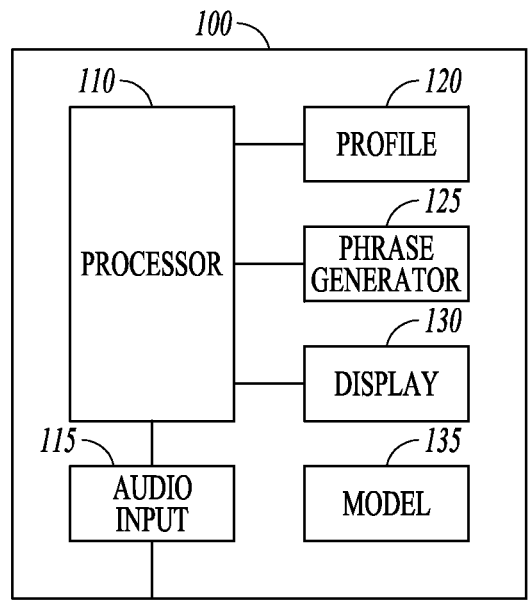
FIG. 1 is a block diagram of a system to generate phrases to be spoken by a user to gain access to a system according to an example embodiment.
FIG. 2 is a table illustrating phonemes and scores for phonemes according to an example embodiment.

FIG. 1 is a block diagram of a system 100 for generating phrases to be spoken by a person to help verify the identity of the person using a system. The phrase may be used by many different systems for verification of a user speaking a password or phrase, and provide access to the system. The system verifying the speaker may use one or more of many different speech verification technologies, commonly referred to as models to match a user profile to the spoken phrase. A phrase can be a single word, or several words strung together. The phrase need not be grammatically correct.

In one embodiment, system 100 includes a processor 110 coupled to receive an audio input 115. The audio input may include an audio jack, or radio frequency receiving implementing one or more wireless protocols. The processor may include a memory, or have access to memory to implement speech processing functions in one embodiment. The processor is coupled to receive a profile 120 corresponding to a user. The profile identifies selected phonemes that the user may pronounce differently than other others, along with a representation of the amount of difference for each phoneme from an average user. The profile 120 may be thought of as containing a plurality of phonemes with user identifying characteristics for such phonemes. The more pronunciation of a phoneme differs from the way most other users pronounce the phoneme, the more the phoneme may be deemed as one which has user identifying characteristics.

The processor 110 is also coupled to a phrase generator 125. The phrase generator 125 may be software stored on a computer readable storage device such that when executed by the processor 110, generates a phrase containing user distinguishing phonemes based on a difference between the user identifying characteristics for such phonemes and average user identifying characteristics, such that the phrase has discriminability from other users. The discriminability may be enhanced based on the magnitude of the difference.

In one embodiment, the audio input 115 is used to receive an audio signal received by the user speaking the generated phrase. The system 110 may include a display 130 coupled to receive the generated phrase and display it to the user so the user can read it out loud. The system 100 may also include a model 135 corresponding to the user and used by the processor 110 to verify whether the phrase was spoken by the user to confirm the identity of the user. The model may be any kind of model in some embodiments that can compare the generated phrase to the audio signal corresponding to the phrase spoken by the user to confirm the identity of the user.

In a further embodiment, the audio input 115 provides a signal representative of background noise in the ambient environment proximate where a user is attempting to access the system 100. The ambient noise is noise that will be picked up by a microphone where the user may attempt to provide an audio phrase or password to gain access to the system. The processor 110 and phrase generator 125 operate to generate a phrase containing user distinguishing phonemes as a function of the ambient noise such that the phrase has enhanced discriminability from the ambient noise. In one embodiment, the profile 120 may instead of providing user distinguishing scores, may have scores representative of the phonemes which are less likely to be pronounced similarly to the ambient noise. For instance, if a user is attempting to access the system 100 while riding a train, the train may produce a proximate ambient noise that is of a particular frequency that is similar to frequencies corresponding to certain phonemes, such as the "r" phoneme. Thus, phrases containing "r" phonemes may not be as easy to process and use to verify that the users speaking them is indeed the correct user.

In a further embodiment, the score in profile 120 may correspond to a combined score based on both ambient noise and user distinguishing pronunciations of phonemes. The score may be a simple average of the scores related to ambient noise and those related to user differences in one embodiment, or may be weighted more toward one or the other.

FIG. 2 is a block diagram of a table 200 for a user that contains phonemes 110, each with an entry corresponding to a difference 115 from normal pronunciation by other users. The difference in one embodiment comprises a score of 0-100, with 0 corresponding to a normal pronunciation. Thus, the higher the score, the more differentiating from other users is the user's pronunciation of the phoneme. Scores shown in this example vary from 10 to 90, with 90, corresponding to the "r" sounds. In this case, perhaps the user has difficulty with the "r" sound, pronouncing it more like a "w". Thus, words with the "r" sound in them are more likely to result in a greater distinction of this user from other users. Similarly, this user pronounces the "d" sound and the "sh" sound significantly different than other users. Thus, by generating a phrase containing "r", "d", and "sh" sounds is more likely to distinguish this user from other users than phrases not containing such sounds.

While the scale of 1-100 was chosen in one embodiment, different scales may be used in further embodiments, such as a variance based scale, or other statistical measure of differences of phonemes. In still further embodiments, the scale may be tied to a particular model used in performing user verification, resulting in phonemes being selected for phrases that are more distinguishing for the particular model used.

Figures 3, 4:
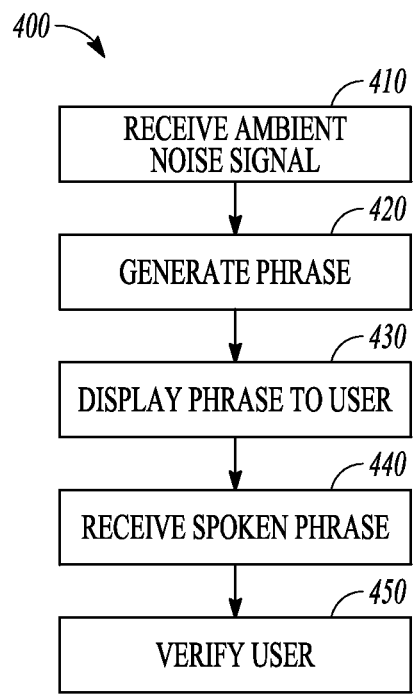
FIG. 3 is a table illustrating phrases with phonemes contained in such phrases for use in generating phrases to gain access to a system according to an example embodiment.
FIG. 4 is a flowchart illustrating a method of selecting and using a phrase to gain access to a computer system according to an example embodiment.

FIG. 3 is a table 300 containing a plurality of phrases 310 with corresponding phonemes 320 contained in the phrases. In this example table, only phonemes having higher scores from table 200 are illustrated. It should be noted that the phrases have other phonemes in them as well, but since they don't distinguish the user from other users as significantly as the phonemes listed, they are not shown to avoid cluttering the illustrated table with insignificant information. Table 300 effectively represents a library of phrases stored on a computer readable storage device. The table 300 may be used by the processor 110 and phrase generator 125 to generate a phrase by searching for a phrase in the library that contains user distinguishing phonemes. In one embodiment, the generated phrase should contain at least two user distinguishing phonemes. In further embodiments, the generated phrase contains at least two instances of a user distinguishing phoneme, which may be same sound, such as "r" or "ch".

In a further embodiment, table 300 contains individual words with associated phonemes. A phrase having enhanced discriminability from other users may be generated from the words in the table with some emphasis on discriminability. The phrase may be randomly generated from the words in one embodiment. In still a further embodiment, the words or phrases in table 300 may be from one or more different languages, such as English, French, Spanish, German, Japanese, Chinese, etc. Words or phrases may also be coined in further embodiments.

One example phrase in table 300 is "short dogs run" This phrase contains the "sh" phoneme with a score of 70, a "d" phoneme with a score of 80, and two "r" phonemes each having a score of 90. The phrase thus contains four highly distinguishing phonemes, and would likely be the most user distinguishing phonemes of the phrases in table 300.

In further embodiments, words for phrases may be selected from a remote server, such as a cloud based server, and the words may be parsed to identify the phonemes. In still further embodiments, a new phrase may be generated each time a user attempts to gain access to a system to minimize the risk that a recording of the user may be used to attempt to gain access.

FIG. 4 is a flowchart illustrating a method 400 of generating a phrase to be spoken by a user to verify that the user has access to a system according to an example embodiment. At 410, an ambient noise signal proximate a user is received. The user is also identified. At 420, a phrase containing user distinguishing phonemes is generated as a function of the ambient noise such that the phrase has enhanced discriminability from the ambient noise. In one embodiment, the generated phrase may also selected as a function of a difference between the user identifying characteristics for such phonemes and average user identifying characteristics, such that the phrase has enhanced discriminability from other users. In still further embodiments, both ambient noise and user differences are used to generate the phrase. In still further embodiment, no ambient noise is received, and only the user differences are used to generate the phrase.

Once the phrase is generated, it is displayed to the user at 430. The user may then read the phrase out loud into a microphone. At 440, the generated phrase spoken by the user is received, and at 450, the system verifies whether the phrase was spoken by the user to confirm the identity of the user.

In one embodiment, generating the phrase at 420 is performed by searching for a phrase in the library that contains user distinguishing phonemes. The generated phrase may contain at least two user distinguishing phonemes. In a further embodiment, the generated phrase contains at least two instances of a user distinguishing phoneme.

In a further embodiment, the user may train a system to their voice, and provide a phrase to be used in the future to access the system. The system may parse this provided phrase to determine whether the phrase provides good discriminability from other users, and provide the user with feedback on the provided phrase. The feedback may indicate that the phrase does not provide adequate discriminability from other users, and may suggest an alternative phrase having a higher discriminability in a manner such as described above. The feedback may also suggest that the user think of a different phrase containing more phonemes which are found to have a higher discriminability from other users, such as: "Please provide a phrase containing more {x, y, and z} sounds (phonemes)."

Figure 5:
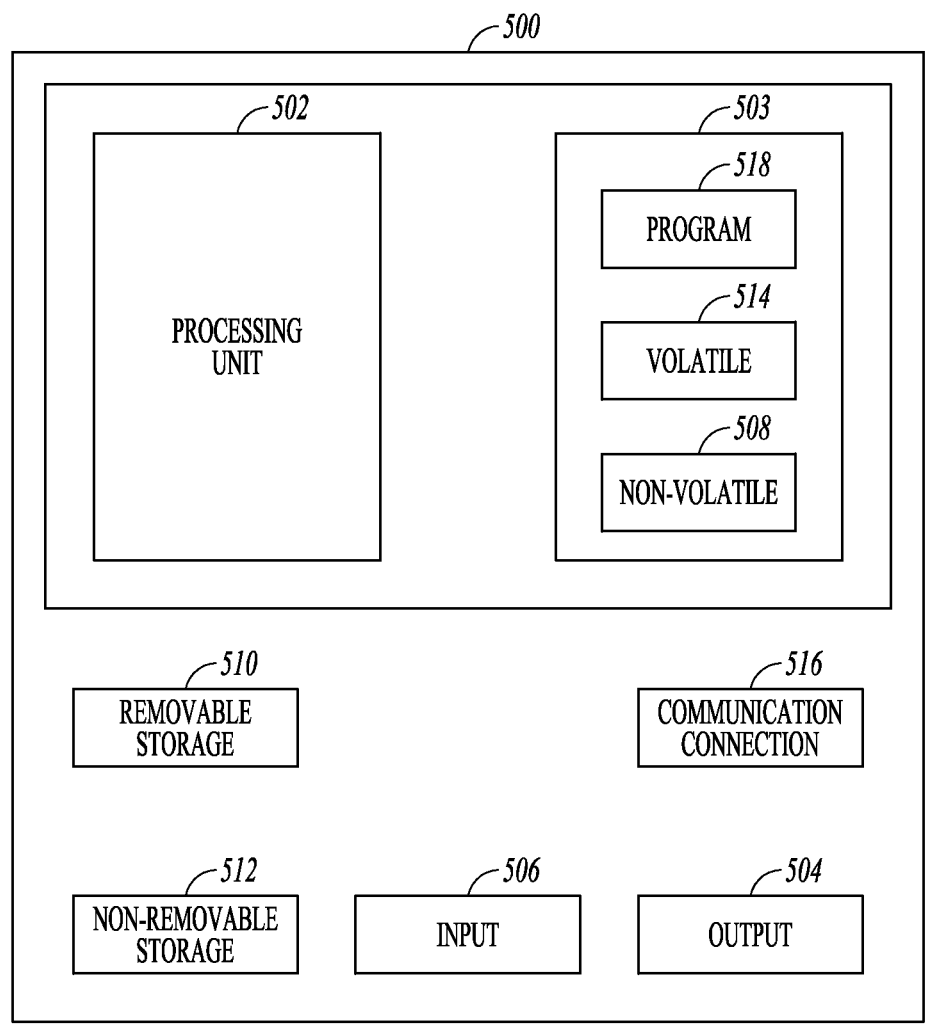
FIG. 5 is a block diagram of an example computer system to implement one or more embodiments.

FIG. 5 is a block schematic diagram of a computer system 500 to implement one or more embodiments. In one embodiment, multiple such computer systems are utilized in a distributed network to implement multiple components. Phrase generation may be performed by one computer system and used by one or more other computer systems to verify the identity of the user. Still further, one or more computer systems may be used to verify the identity of the user for other computer systems which the user is attempting to access. In one embodiment, the computer system may be a smart phone with build in microphone. An object-oriented, service-oriented, or other architecture may be used to implement such functions and communicate between the multiple systems and components. One example computing device in the form of a computer 500, may include a processing unit 502, memory 503, removable storage 510, and non-removable storage 512. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 500 to provide generic access controls in a COM based computer network system having multiple users and servers.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
   a user speech profile stored on a computer readable storage device, the speech profile containing a plurality of phonemes with user identifying characteristics for the phonemes, wherein the identifying characteristic comprise a representation of the amount of pronunciation difference for each of the plurality of phonemes from an average user; and
   a speech processor coupled to access the speech profile and generate a phrase containing user distinguishing phonemes based on the pronunciation difference between the user identifying characteristics for such phonemes and average user identifying characteristics, such that the phrase has discriminability from other users wherein the speech processor generates the phrase by searching for a phrase in a library that contains user distinguishing phonemes, wherein a user distinguishing phoneme is based on pronunciation of a phoneme by a user differing from the way most other users pronounce the phoneme and wherein such distinguishing phonemes have an associated score indicative of a magnitude by which such pronunciation differs and wherein the associated score is adjusted based on a difference of the pronunciation from ambient noise, resulting in a different generated phrase in the presence of the ambient noise.

2. The system of claim 1 and further comprising an audio input to receive the generated phrase spoken by the user.

3. The system of claim 2 and further comprising a display coupled to receive the generated phrase and display it to the user.

4. The system of claim 1 wherein the speech processor further receives the generated phrase spoken by the user via the audio input and verifies whether the phrase was spoken by the user to confirm the identity of the user and allow access to the system.

5. The system of claim 1 wherein the generated phrase contains at least two user distinguishing phonemes.

6. The system of claim 1 wherein the generated phrase contains at least two instances of a user distinguishing phoneme, and wherein the associated score is an average of scores related to ambient noise and user differences in pronunciation.

7. A system comprising:
   an audio input to receive speech from a user, the speech including ambient noise proximate the user;

a speech processor coupled to the audio input to generate a phrase containing user distinguishing phonemes as a function of an associated score indicative of a magnitude by which pronunciation of the distinguishing phonemes differs from that of an average user, wherein the associated score includes an ambient noise score such that the phrase has discriminability from the ambient noise, wherein the speech processor generates the phrase by searching for a phrase in a library that contains user distinguishing phonemes, and wherein the associated score is adjusted based on a difference of the pronunciation from ambient noise, resulting in a different generated phase in the presence of the ambient noise.

8. The system of claim 7 wherein the speech processor selects the phrase as a function of a difference between the user identifying characteristics for such phonemes and average user identifying characteristics, such that the phrase has enhanced discriminability from other users.

9. The system of claim 7 and further comprising:
an audio input to receive the generated phrase spoken by the user; and
a display coupled to receive the generated phrase and display it to the user.

10. The system of claim 7 wherein the speech processor further receives the generated phrase spoken by the user via the audio input and verities whether the phrase was spoken by the user to confirm the identity of the user.

11. The system of claim 7 and further comprising a library of phrases stored on a computer readable storage device, and wherein the speech processor generates the phrase by searching for a phrase in the library that contains user distinguishing phonemes.

12. The system of claim 11 wherein the generated phrase contains at least two user distinguishing phonemes.

13. The system of claim 11 wherein the generated phrase contains at least two instances of a user distinguishing phoneme.

14. A method comprising:
receiving a speech audio input from a user, the speech including ambient noise signal proximate the user; and
generating a phrase containing user distinguishing phonemes by a speech processor coupled to the audio input, as a function of an associated score indicative of a magnitude by which pronunciation of the distinguishing phonemes differs from that of an average user, wherein the associated score includes an ambient noise score such that the phrase has discriminability from the ambient noise, wherein the speech processor generates the phrase by searching for a phrase in a library that contains user distinguishing phonemes, and wherein the ambient noise score results in a generation of a different phrase in the presence of the ambient noise.

15. The method of claim 14 wherein the generated phrase is also selected as a function of a difference between the user identifying characteristics for such phonemes and average user identifying characteristics, such that the phrase has enhanced discriminability from other users.

16. The method of claim 14 and further comprising:
displaying the generated phrase to the user;
receiving the generated phrase spoken by the user; and
verifying whether the phrase was spoken by the user to confirm the identity of the user.

17. The method of claim 14 wherein generating the phrase is performed by searching for a phrase in the library that contains user distinguishing phonemes.

18. The method of claim 17 wherein the generated phrase contains at least two user distinguishing phonemes.

19. The system of claim 17 wherein the generated phrase contains at least two instances of a user distinguishing phoneme.

* * * * *